US012756670B2

(12) United States Patent
Ihlar et al.

(10) Patent No.: US 12,756,670 B2

(45) Date of Patent: Oct. 6, 2026

(54) MAXIMUM TRANSMISSION UNIT SIZE ENFORCEMENT

(71) Applicant: Telefonaktiebolaget LM Ericsson (publ), Stockholm (SE)

(72) Inventors: Marcus Ihlar, Älvsjö (SE); Miguel Angel Muñoz De La Torre Alonso, Madrid (ES)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 307 days.

(21) Appl. No.: 18/290,210

(22) PCT Filed: May 11, 2022

(86) PCT No.: PCT/EP2022/062724

§ 371 (c)(1),
(2) Date: Nov. 10, 2023

(87) PCT Pub. No.: WO2022/238456

PCT Pub. Date: Nov. 17, 2022

(65) Prior Publication Data

US 2025/0317402 A1 Oct. 9, 2025

(30) Foreign Application Priority Data

May 12, 2021 (EP) .................................... 21382442

(51) Int. Cl.
*H04L 47/36* (2022.01)
*H04W 8/22* (2009.01)
*H04W 48/18* (2009.01)

(52) U.S. Cl.
CPC ............... *H04L 47/36* (2013.01); *H04W 8/22* (2013.01); *H04W 48/18* (2013.01)

(58) Field of Classification Search
CPC .......... H04L 47/36; H04W 8/22; H04W 48/18
(Continued)

(56) References Cited

U.S. PATENT DOCUMENTS 9,225,645 B2 * 12/2015 Coene ..................... H04L 47/19
9,356,879 B2 * 5/2016 Sundar .................... H04L 45/74
(Continued)

FOREIGN PATENT DOCUMENTS

EP 3331205 A1 * 6/2018 ............. H04L 69/16
WO WO-2018121257 A1 * 7/2018 ............... H04L 9/40

OTHER PUBLICATIONS

A. Custura, G. Fairhurst and I. Learmonth, "Exploring Usable Path MTU in the Internet," 2018 Network Traffic Measurement and Analysis Conference (TMA), Vienna, Austria, 2018, pp. 1-8. (Year: 2018).*

(Continued)

*Primary Examiner* — Melvin H Pollack
(74) *Attorney, Agent, or Firm* — COATS & BENNETT, PLLC

(57) ABSTRACT

There is provided a method for performing Maximum Transmission Unit size enforcement. The method comprises: receiving at a first node, a first Maximum Transmission Unit size threshold and at least one Packet Detection Rule associated with the first Maximum Transmission Unit size threshold, each of the at least one Packet Detection Rule being associated with one or more enforcement actions for a Protocol Data Unit session; determining at the first node, whether the size of a packet received from a network host exceeds the first Maximum Transmission Unit size threshold; and performing at the first node, an action corresponding to the at least one Packet Detection Rule associated with the first Maximum Transmission Unit size threshold if it is determined that the size of the packet exceeds the first Maximum Transmission Unit size threshold.

20 Claims, 5 Drawing Sheets

(58) Field of Classification Search
USPC .......................................................... 370/229
See application file for complete search history.

(56) References Cited

U.S. PATENT DOCUMENTS

| | | | | |
|---|---|---|---|---|
| 9,413,652 | B2 * | 8/2016 | Mahapatra | H04L 69/166 |
| 9,503,362 | B2 * | 11/2016 | Sreeramoju | H04L 47/36 |
| 9,641,435 | B1 * | 5/2017 | Sivaramakrishnan | G06F 9/45558 |
| 9,660,902 | B2 * | 5/2017 | Suzuki | H04L 45/28 |
| 9,787,596 | B2 * | 10/2017 | Huang-Fu | H04L 47/36 |
| 9,923,835 | B1 * | 3/2018 | Singh | H04L 12/4633 |
| 10,116,569 | B1 * | 10/2018 | Panchanathan | H04L 43/0882 |
| 10,257,087 | B2 * | 4/2019 | Yamamoto | H04L 47/36 |
| 10,469,232 | B2 * | 11/2019 | Singh | H04L 69/22 |
| 10,581,749 | B2 * | 3/2020 | Kumar | H04L 12/4633 |
| 10,582,022 | B2 * | 3/2020 | Momchilov | H04L 69/40 |
| 10,798,014 | B1 * | 10/2020 | Krishnamurthy | H04L 47/36 |
| 10,841,834 | B2 * | 11/2020 | Gottwerth | H04W 28/0226 |
| 10,992,590 | B2 * | 4/2021 | Yu | H04L 47/36 |
| 11,159,437 | B2 * | 10/2021 | Wondra | H04L 47/36 |
| 11,329,927 | B2 * | 5/2022 | Calciu | H04L 43/0829 |
| 11,451,485 | B2 * | 9/2022 | Sivaraj | H04L 67/12 |
| 11,553,463 | B2 * | 1/2023 | Panchal | H04W 48/18 |
| 11,570,660 | B2 * | 1/2023 | Cunningham | H04W 24/08 |
| 11,687,536 | B2 * | 6/2023 | Sharma | G06F 16/24575 707/722 |
| 11,924,114 | B2 * | 3/2024 | Park | H04L 43/0888 |
| 11,963,247 | B2 * | 4/2024 | Faccin | H04W 76/18 |
| 12,119,673 | B2 * | 10/2024 | Kim | H04W 12/00 |
| 12,207,218 | B2 * | 1/2025 | Li | H04L 67/34 |
| 12,279,110 | B2 * | 4/2025 | Wang | H04L 65/1069 |
| 12,323,310 | B2 * | 6/2025 | Han | H04L 65/1016 |
| 12,335,430 | B2 * | 6/2025 | Youn | H04W 76/20 |
| 12,355,668 | B2 * | 7/2025 | Bouvet | H04L 47/2408 |
| 12,376,059 | B2 * | 7/2025 | Gupta | H04W 4/70 |
| 2003/0188015 | A1 | 10/2003 | Lee et al. | |
| 2015/0117452 | A1 * | 4/2015 | Mosko | H04L 45/306 370/392 |
| 2020/0059992 | A1 | 2/2020 | Skog et al. | |
| 2022/0295316 | A1 * | 9/2022 | Vos | H04W 72/23 |

OTHER PUBLICATIONS

Hussain, Ishfaq and Bashir, Janibul. "Dynamic MTU: Technique to Reduce Packet Drops in IPV6 Network Resulted Due to Smaller Path MTU Size," Cornell University, arXiv, vol. 1911.11468, version 4, Nov. 16, 2020, pp. 1-28. (Year: 2020).*

Luckie, Matthew and Stasiewicz, Ben. "Measuring path MTU discovery behaviour," IMC '10: Proceedings of the 10th ACM SIGCOMM conference on Internet measurement, Nov. 1, 2010, pp. 102-108. (Year: 2010).*

Bagheri, Hanieh, et al. "Making do with what we've got: Using PMTUD for a higher DNS responsiveness." University of Amsterdam, System and Network Engineering, Feb. 28, 2013. (Year: 2013).*

Fairhurst, G et al. "Packetization Layer Path MTU Discovery for Datagram Transports," RFC 8899, Sep. 2020. (Year: 2020).*

3rd Generation Partnership Project, "3rd Generation Partnership Project; Technical Specification Group Core Network and Terminals; 5G System; Usage of the Unified Data Repository service for Policy Data, Application Data and Structured Data for Exposure; Stage 3 (Release 17)", Technical Specification, 3GPP TS 29.519 V17.2.0, Mar. 2021, pp. 1-176, 3GPP, France.

Fairhurst, G., et al., "Packetization Layer Path MTU Discovery for Datagram Transports", Proposed Standard, RFC 8899, Sep. 2020, pp. 1-30, Internet Engineering Task Force (IETF).

Kuehlewind, M., et al., "Manageability of the QUIC Transport Protocol", Network Working Group Internet-Draft, Apr. 21, 2021, pp. 1-34, IETF.

* cited by examiner

MAXIMUM TRANSMISSION UNIT SIZE ENFORCEMENT

TECHNICAL FIELD

The present disclosure relates to the field of Maximum Transmission Unit (MTU) size enforcement, specifically methods, communication systems, and apparatuses for controlling and/or enforcing the MTU size for QUIC traffic in 5G networks.

BACKGROUND

FIG. 1 illustrates the 5G reference architecture as defined by 3GPP. As shown in FIG. 1, the architecture includes a Unified Data Repositor (UDR), a Network Exposure Function (NEF), a Network Data Analytics Function (NWDAF), an Application Function (AF), a Policy Control Function (PCF), a Charging Function (CHF), an Access and Mobility Management Function (AMF), a Session Management Function (SMF), and a User Plane Function (UPF).

The Unified Data Repository (UDR) stores data grouped into distinct collections of subscription-related information:

Subscription Data

Policy Data

Structured Data for Exposure

Application Data

The Policy Control Function (PCF) supports a unified policy framework to govern the network behaviour. Specifically, the PCF provides Policy and Charging Control (PCC) rules to the Policy and Charging Enforcement Function (PCEF), i.e. the Session Management Function (SMF)/User Plane Function (UPF) that enforces policy and charging decisions according to provisioned PCC rules.

The Session Management function (SMF) supports different functionalities, e.g. the SMF receives PCC rules from the PCF and configures the UPF accordingly.

QUIC is a User Datagram Protocol (UDP) based stream-multiplexed and secure transport protocol with integrity protected header and encrypted payload. Unlike the traditional transport protocol stack with Transmission Control Protocol (TCP), which resides in the operating system kernel, QUIC can easily be implemented in user space, i.e. in the application layer. As a consequence, this improves flexibility in terms of transport protocol evolution with implementation of new features, congestion control, deploy ability and adoption.

QUIC is likely to become the main transport protocol in the Internet's user plane. It is expected that most applications running today over Hypertext Transfer Protocol (HTTP)/Hypertext Transfer Protocol Secure (HTTPS) will migrate to QUIC, driven by latency improvements and stronger security. Notably, compared to HTTPS, encryption in QUIC covers both the transport protocol headers as well as the payload, as opposed to Transport Layer Security (TLS) over Transmission Control Protocol (TCP), e.g. HTTPS, which protects only the payload.

SUMMARY

One aspect of the present disclosure provides a method for performing Maximum Transmission Unit (MTU) size enforcement. The method comprises receiving, at a first node, a first MTU size threshold and at least one Packet Detection Rule (PDR) associated with the first MTU size threshold, each of the at least one PDR being associated with one or more enforcement actions for a Protocol Data Unit (PDU) session. The method further comprises determining, at the first node, whether the size of a packet received from a network host exceeds the first MTU size threshold. The method further comprises performing, at the first node, an action corresponding to the at least one Packet Detection Rule (PDR) associated with the first MTU size threshold if it is determined that the size of the packet exceeds the first MTU size threshold.

Another aspect of the present disclosure provides a communication system configured to perform Maximum Transmission Unit (MTU) size enforcement, the communication system comprises a first node configured to: receive a first MTU size threshold and at least one Packet Detection Rule (PDR) associated with the first MTU size threshold, each of the at least one PDR being associated with one or more enforcement actions for a Protocol Data Unit (PDU) session. The first node is further configured to determine whether the size of a packet received from a network host exceeds the first MTU size threshold. The first node is further configured to perform an action corresponding to the at least on PDR associated with the first MTU size threshold if it is determined that the size of the packet exceeds the first MTU size threshold.

Another aspect of the present disclosure provides an apparatus comprising a processor coupled with a memory. The apparatus is configured to: receive, at a first node, a first Maximum Transmission Unit (MTU) size threshold and at least one Packet Detection Rule (PDR) associated with the first MTU size threshold, each of the at least one PDR being associated with one or more enforcement actions for a Protocol Data Unit (PDU) session. The apparatus is further configured to determine, at the first node, whether the size of a packet received from a network host exceeds the first MTU size threshold. The apparatus is further configured to perform, at the first node, an action corresponding to the at least one PDR associated with the first MTU size threshold if it is determined that the size of the packet exceeds the first MTU size threshold.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
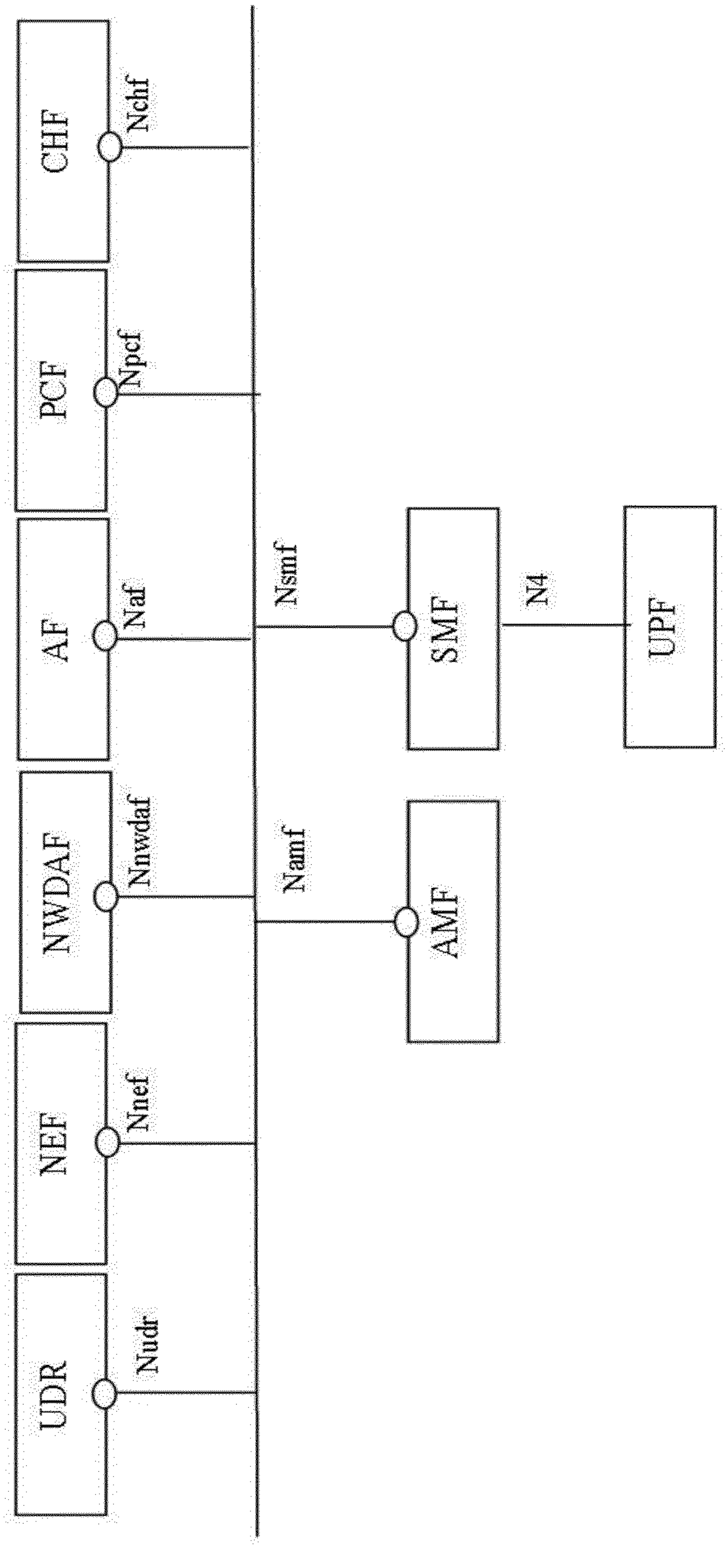
FIG. 1 illustrates the 5G reference architecture of policy and charging control framework.

A number of problems are identified in the existing technology regarding MTU size enforcement requirements. Firstly, there are customers that have requirements that relate to Maximum Transmission Unit size enforcement. Specifically, these customers may wish to announce a MTU size for the Data Network Name (DNN) or Single Network Slice Selection Assistance information (S-NSSAI) of, for example, 1500 bytes. This may be required for certain services to work. However, sending 1500 bytes packets may lead to fragmentation in their networks, due to various tunnel overheads. This may be acceptable for some services, but it is not acceptable for the bulk of user plane traffic.

Secondly, even though end-to-end IP packets indicate that they should not be fragmented, that information can get lost in the various layers of encapsulation that happens in a mobile network (e.g. General Packet Radio Service Tunnelling Protocol user data tunneling (GTP-U), Internet Protocol Security (IPsec), etc.). This can lead to fragmentation of packets that should not be fragmented.

Thirdly, the solution for Transmission Control Protocol (TCP) is straightforward-use maximum segment size (MSS) clamping. However, clamping does not work for QUIC, due to encryption and integrity protection.

Embodiments described herein relate to a mechanism for controlling and/or enforcing the MTU size for data traffic in 4G and 5G networks, e.g. QUIC traffic. Some embodiments described herein provide a solution for the above-mentioned problems based on the Mobile Network Operator (MNO) controlling a MTU size for QUIC traffic in 5G networks, through extensions of the N7/N4 interfaces to configure UPF to detect QUIC packets with a size higher than the configured MTU size (e.g. on a per DNN or S-NSSAI basis), drop them and UPF to generate an Internet Control Message Protocol (ICMP) Packet Too Big (PTB) message towards the source. The solution described in the embodiments herein also allow control and/or enforcement of the MTU size for traffic in 4G networks, as explained in more detail below.

According to some of the embodiments described herein, the UPF is to support a new capability, i.e. Path MTU Discovery (PMTUD), which is reported to the SMF as part of the Packet Forwarding Control Protocol (PFCP) association procedure. Furthermore, assuming the MNO wants to control (e.g. on a per DNN or S-NSSAI basis) the MTU size, e.g. “MTU=X bytes”) for all the traffic that should not be fragmented, including QUIC traffic, it is proposed that the PCF configures the UPF (through the SMF) by means of the N7/N4 extensions, specifically to instruct the UPF to apply the following procedure, on a per PFCP session, traffic type, or application basis:

- If the UPF detects a QUIC packet with a size higher than X bytes, the UPF drops the packet and generates an Internet Control Message Protocol (ICMP) Packet Too Big (PTB) message or ICMPv6 PTB message towards the source of the packet. If the packet is a QUIC packet, the Don’t Fragment (DF) bit must be set in the IPV4 header
- Non-QUIC packets can be dropped in a similar manner, if the DF bit is set or if they are IPv6 packets and the packet size is larger than X bytes.

According to some of the embodiments described herein, the Packet Detection Rule (PDR)/Packet Detection Information (PDI) can be extended to detect QUIC traffic exceeding a certain packet size (e.g. size >X bytes) and the associated Forwarding Action Rule (FAR) is proposed to be extended to include a new action to indicate that the packet should be dropped, and that an ICMP PTB message should be generated and sent towards the source of the packet.

Figure 2:
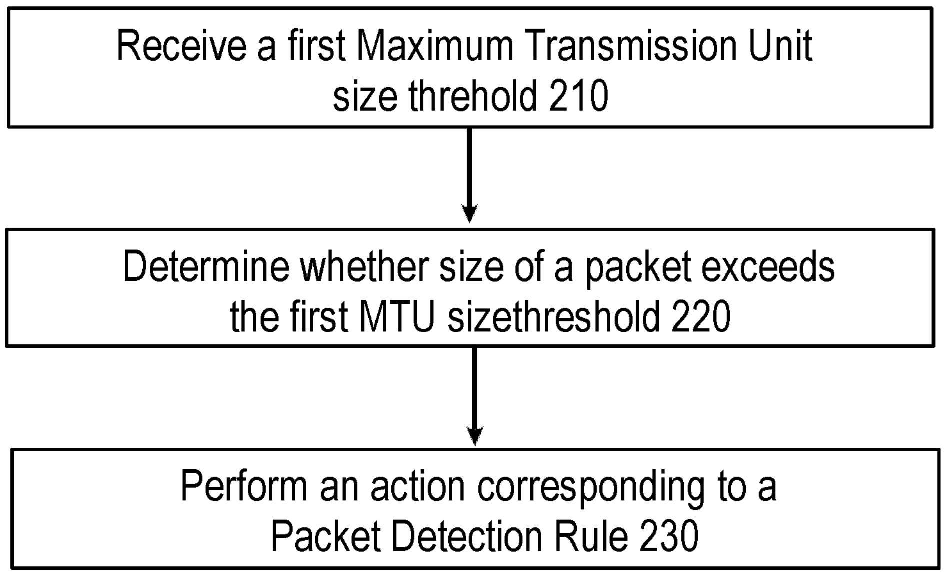
FIG. 2 is a flow chart of a method for performing Maximum Transmission Unit (MTU) size enforcement, according to an embodiment of the present disclosure.

FIG. 2 is a flow chart of a method for performing MTU size enforcement, according to an embodiment of the present disclosure. The method illustrated in FIG. 2 may be performed by a communication system, such as the communication system illustrated in FIG. 3, or by an apparatus comprising a processor coupled with a memory, such as the apparatus illustrated in FIG. 4.

With reference to FIG. 2, at step 210, a first MTU size threshold and at least one Packet Detection Rule (PDR) associated with the first MTU size threshold are received at a first node. Each of the at least one PDR is associated with one or more enforcement actions for a Protocol Data Unit (PDU) session. The packet may be a QUIC packet, or a IPv6 packet, or a IPv4 packet where a Don’t Fragment (DF) bit of the IPV4 packet is set to 1. The one or more enforcement actions for a PDU session may be indicated in Packet Detection Information (PDI) of the corresponding PDR. Furthermore, the one or more enforcement actions for a PDU session may each be represented by one of: a Forwarding Action Rule (FAR), a Quality of Service Enforcement Rule (QER), and a Usage Reporting Rule (URR).

In a 5G implementation, the first node may be a User Plane Function (UPF). In a 4G implementation, the first node may be a Packet Data Network Gateway-User Plane Function (PWG-U) or a Traffic Detection Function-User Plane Function (TDF-U).

In some embodiments, the first MTU size threshold and the at least one Packet Detection Rule associated with the first MTU size threshold may be received from a second node as part of a Packet Forwarding Control Protocol (PFCP) session establishment request. In these embodiments, the PFCP session establishment request may further comprise an indication to enable a Path MTU Discovery (PMTUD) support procedure. The indication to enable a PMTUD support procedure may refer to a whole PFCP session, it may refer to a specific one of at least one PDRs. The indication to enable a PMTUD support procedure may be in a PFCPSerReg-Flag in some embodiments.

In a 5G implementation, the second node may be a Session Management Function (SMF). In a 4G implementation, the second node may be a Packet Data Network Gateway-Control Plane Function (PWG-C) or a Traffic Detection Function-Control Plane Function (TDF-C).

Returning to FIG. 2, at step 220, it is determined at the first node whether the size of a packet received from a network host (e.g. an application client for uplink packets, an application server for downlink packets) exceeds the first MTU size threshold. In some embodiments, the first MTU size threshold may be associated with the first node, and may be lower than a second MTU size threshold associated with a network interface at which packets including the packet from the network host are received.

If it is determined at step 220 that the size of the packet exceeds the first MTU size threshold, then at step 230, an action corresponding to the at least one Packet Detection Rule (PDR) associated with the first MTU size threshold is performed at the first node. The action corresponding to the at least one PDR associated with the first MTU size threshold may comprise at least one of: dropping the packet, generating a Packet Too Big (PTB) message, and sending the PTB message to a source of the packet (e.g. an application client for uplink packets, or an application server for downlink packets). In some embodiments, the PTB message is an Internet Control Message Protocol (ICMP) PTB message or ICMPv6 PTB message.

Although not illustrated in FIG. 2, in some embodiments the method may further comprise, prior to determining at step 220 whether the size of the packet exceeds the first MTU size threshold, configuring the first MTU size threshold for a Data Network Name (DNN), or an Access Point Name (APN), or a Single Network Slice Selection Assistance Information (S-NSSAI) by a Mobile Network Operator. In these embodiments, configuring the first MTU size threshold may comprise configuring the first MTU size threshold in a third node as policy data. The third node may be a Unified Data Repository (UDR) in a 5G implementation, or it may be a Subscriber Profile Repository (SPR) in a 4G implementation.

Although not illustrated in FIG. 2, in some embodiments the method may further comprise, prior to determining at step 220 whether the size of the packet exceeds the first MTU size threshold, reporting, from the first node to a fourth node, a Path MTU Discovery (PMTUD) capability of the first node, and selecting, by the fourth node, the first node among a plurality of nodes of a same type as the first node, based on the PMTUD capability of the first node. In these embodiments, reporting the PMTUD capability of the first node may be performed at a Packet Forwarding Control Protocol (PFCP) association procedure between the first node and the fourth node. The fourth node may be a Session Management Function (SMF) in a 5G implementation, or it may be a Packet Data Network Gateway-Control Plane Function (PWG-C) or a Traffic Detection Function-Control Plane Function (TDF-C) in a 4G implementation. In some embodiments, the fourth node may be the same entity as the second node.

Furthermore, in these embodiments, the fourth node may allocate a plurality of instances to nodes of a same type as the first node (e.g. UPF instances), and determining whether the size of the packet exceeds the first MTU size threshold at step 200 may only performed at one of the plurality of instances. In more detail, in some cases the instance at which whether the size of the packet exceeds the first MTU size threshold is determined at step 220 may be one that receives uplink traffic on a N3 interface, or one that receives downlink traffic on a N6 interface.

Although not illustrated in FIG. 2, in some embodiments the method may further comprise, prior to determining at step 220 whether the size of the packet exceeds the first MTU size threshold: retrieving, by a fifth node from a sixth node, subscriber management data corresponding to a wireless device (e.g. a User Equipment or a terminal device) from which the packet was received, and one or more policies to be applied for one of: a corresponding target Data Network Name (DNN), a corresponding target Access Point Name (APN), and a corresponding target Single Network Slice Selection Assistance Information (S-NSSAI).

In these embodiments, the one or more policies may include an indication to request MTU size enforcement for the traffic in a Protocol Data Unit (PDU) session for one of: the corresponding target DNN, the corresponding target APN, and a corresponding target S-NSSAI. In addition, in these embodiments, the indication to request MTU size enforcement may refer to the whole PDU session, or to a subset of the traffic within the PDU session.

The fifth node may be a Policy Control Function (PCF) in a 5G implementation or a Policy Control and Charging Rules Function (PCRF) in a 4G implementation. The sixth node may be a Unified Data Repository (UDR in a 5G implementation, or a Subscriber Profile Repository (SPR) in a 5G implementation. In some embodiments, the sixth node may be the same entity as the third node.

Furthermore, in these embodiments, the method may further comprise retrieving, by the fifth node from the sixth node, the value of the first Maximum Transmission Unit (MTU) size threshold.

Moreover, in these embodiments, the method may further comprise storing, at the fifth node, the indication to request MTU size enforcement for the traffic in the PDU session for one of: the corresponding target DNN, the corresponding target APN, and a corresponding target S-NSSAI, generating, at the fifth node, one or more Policy and Charging Control (PCC) rules based on the indication to request MTU size enforcement for the traffic in the PDU session, and sending, from the fifth node to the second node, the indication to request MTU size enforcement for the traffic in the PDU session. The indication to request Maximum Transmission Unit (MTU) size enforcement may refer to the whole PDU session or to a specific one of the one or more Policy and Charging Control (PCC) rules.

It will be appreciated that the terms “first node”, “second node”, “third node”, “fourth node”, “fifth node”, and “sixth node” are used in the context of the present disclosure to denote different nodes that may or may not be used in combination in certain embodiments, rather than indicating that a certain node is to be used in combination with any other nodes or indicating a sequential interrelationship between such nodes. In some embodiments it may not be necessary to include some respective nodes in combination.

Any appropriate steps, methods, or functions described above with reference to FIG. 2 may be performed through a computer program product. The computer program may include instructions which cause an apparatus (and any operatively coupled entities and devices) to execute methods according to embodiments described herein. The computer program and/or computer program product may thus provide means for performing any steps herein disclosed.

Figure 3:
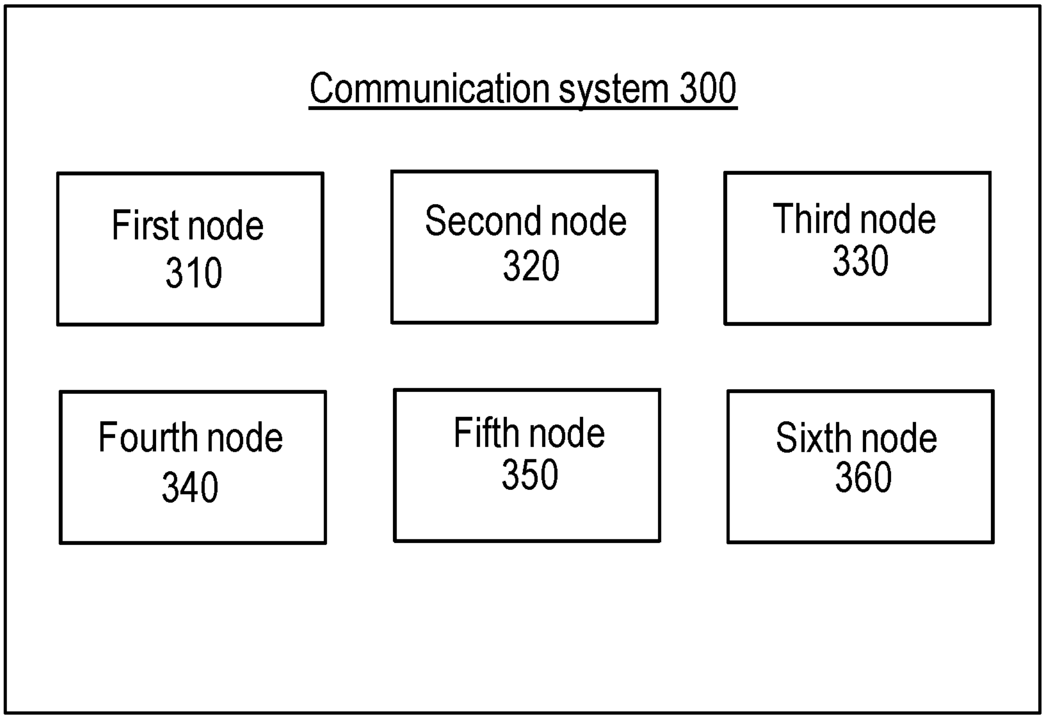
FIG. 3 illustrates a communication system configured to perform MTU size enforcement, according to an embodiment of the present disclosure.

FIG. 3 illustrates a communication system configured to perform MTU size enforcement, according to an embodiment of the present disclosure. As shown in FIG. 3, the communication system 300 comprises a first node 310, a second node 320, a third node 330, a fourth node 340, a fifth node 350, and a sixth node 360. As will be explained in more detail below, in some embodiments the second node 320 and the fourth node 340 may be implemented as the same node/entity. Similarly, in some embodiments, the third node 330 and the sixth node 360 may be implemented as the same node/entity.

In a 5G implementation, the first node may be a User Plane Function (UPF), the second node may be a Session Management Function (SMF), the third node may be a Unified Data Repository (UDR), the fourth node may be a Session Management Function (SMF) the fifth node may be a Policy Control Function (PCF), and the sixth node may be a Unified Data Repository (UDR). Operations of the second node and the fourth node as described below may be realised in a single Session Management Function entity, and operations of the third node and the sixth node as described below may be realised in a single Unified Data Repository entity.

In a 4G implementation, the first node may be a Packet Data Network Gateway-User Plane Function (PWG-U) or a Traffic Detection Function-User Plane Function (TDF-U), the second node may be a Packet Data Network Gateway-Control Plane Function (PWG-C) or a Traffic Detection Function-Control Plane Function (TDF-C), the third node may be a Subscriber Profile Repository (SPR), the fourth node may be a Packet Data Network Gateway-Control Plane Function (PWG-C) or a Traffic Detection Function-Control Plane Function (TDF-C), the fifth node may be a Policy Control and Charging Rules Function (PCRF), and the sixth node may be a Subscriber Profile Repository (SPR). Operations of the second node and the fourth node as described below may be realised in a single PWG-C or TDF-C entity, and operations of the third node and the sixth node as described below may be realised in a single Subscriber Profile Repository entity.

The first node 310 is configured to receive a first MTU size threshold and at least one Packet Detection Rule (PDR) associated with the first MTU size threshold, each of the at least one PDR being associated with one or more enforcement actions for a Protocol Data Unit (PDU) session. The packet may be a QUIC packet, or a IPv6 packet, or a IPv4 packet where the Don't Fragment (DF) bit of the IPV4 packet is set to 1. The one or more enforcement actions for a PDU session may be indicated in Packet Detection Information (PDI) of the corresponding PDR. Furthermore, the one or more enforcement actions for a PDU session may each be represented by one of: a Forwarding Action Rule (FAR), a Quality of Service Enforcement Rule (QER), and a Usage Reporting Rule (URR).

In some embodiments, the first MTU size threshold may be associated with the first node and may be lower than a second MTU size threshold associated with a network interface at which packets including the packet from the network host are received.

The first MTU size threshold and the at least one Packet Detection Rule associated with the first MTU size threshold may be received from the second node 320 as part of a Packet Forwarding Control Protocol (PFCP) session establishment request. The PFCP session establishment request may further comprise an indication to enable a Path MTU Discovery (PMTUD) support procedure. The indication to enable a PMTUD support procedure may refer to a whole PFCP session or to a specific one of at least one PDRs. In some embodiments, the indication to enable a PMTUD support procedure may be in a PFCPSerReg-Flag.

The first node 310 is further configured to determine whether the size of a packet received from a network host exceeds the first MTU size threshold, and perform an action corresponding to the at least on PDR associated with the first MTU size threshold if it is determined that the size of the packet exceeds the first MTU size threshold. The action corresponding to the at least one PDR associated with the first Maximum Transmission Unit (MTU) size threshold may comprise at least one of: dropping the packet, generating a Packet Too Big (PTB) message, and sending the PTB message to a source of the packet. The PTB message may be an Internet Control Message Protocol (ICMP) PTB message or ICMPv6 PTB message. The source of the packet may be an application client or an application server.

Although not illustrated in FIG. 3, in some embodiments a Mobile Network Operator (MNO) of the communication system 300 may configure the first MTU size threshold for a Data Network Name (DNN), or an Access Point Name (APN), or a Single Network Slice Selection Assistance Information (S-NSSAI). This configuration operation may be performed prior to the operations at the first node 310. Furthermore, the MNO may be configured to configure the first MTU size threshold by configuring the first MTU size threshold in the third node 330 as policy data.

In some embodiments, the first node 310 may be configured to report to the fourth node 340 a Path MTU Discovery (PMTUD) capability of the first node 310. This reporting operation may be performed at a Packet Forwarding Control Protocol (PFCP) association procedure between the first node 310 and the fourth node 340. In these embodiments, the fourth node 340 may be configured to select the first node 310 among a plurality of nodes of a same type as the first node (e.g. a plurality of UPFs), based on the PMTUD capability of the first node 310.

In some embodiments, the fourth node 340 may be configured allocate a plurality of instances to nodes of a same type as the first node 310 (e.g. a plurality of UPF instances). In these embodiments, only the first node 310 (out of the plurality of instances of the same type) is configured to determine whether the size of the packet exceeds the first MTU size threshold. The first node 310 may be the instance that receives uplink traffic on a N3 interface, or the instance that receives downlink traffic on a N6 interface.

In some embodiments, the fifth node 350 may be configured to retrieve, from the sixth node 360, subscriber management data corresponding to a wireless device (e.g. a User Equipment or a terminal device) from which the packet was received, and one or more policies to be applied for one of: a corresponding target Data Network Name (DNN), a corresponding target Access Point Name (APN), and a corresponding target Single Network Slice Selection Assistance Information (S-NSSAI). The fifth node 350 may be configured to perform the retrieving operation prior to the first node 310 determining whether the size of the packet exceeds the first MTU size threshold. Furthermore, in these embodiments, the fifth node 350 may be further configured to retrieve, from the sixth node 360, the value of the first MTU size threshold.

In these embodiments, the one or more policies may include an indication to request MTU size enforcement for the traffic in a Protocol Data Unit (PDU) session for one of: the corresponding target DNN, the corresponding target APN, and a corresponding target S-NSSAI. In these embodiments, the indication to request MTU size enforcement may refer to the whole PDU session, or to a subset of the traffic within the PDU session.

The fifth node 350 may be further configured to store the indication to request MTU size enforcement for the traffic in the PDU session for one of: the corresponding target DNN, the corresponding target APN, and a corresponding target S-NSSAI, generate one or more Policy and Charging Control (PCC) rules based on the indication to request MTU size enforcement for the traffic in the PDU session, and send the indication to request MTU size enforcement for the traffic in the PDU session to the second node 320. In these embodiments, the indication to request MTU size enforcement may refer to the whole PDU session or to a specific one of the one or more Policy and Charging Control (PCC) rules.

It will be appreciated that FIG. 3 only shows the components required to illustrate an aspect of the communication system 300 and, in a practical implementation, the communication system 300 may comprise alternative or additional components to those shown.

Figure 4:
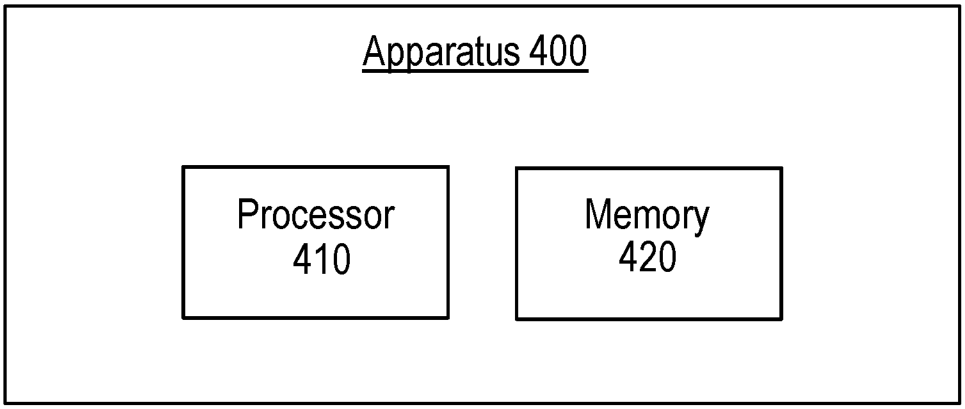
FIG. 4 illustrates an apparatus according to an embodiment of the present disclosure.

FIG. 4 illustrates an apparatus according to an embodiment of the present disclosure. As shown in FIG. 4, the apparatus 400 comprises a processor 410 and a memory 420. The processor 410 is coupled with the memory 420. Although FIG. 4 shows the memory 420 as being a component of the apparatus 400, it will be appreciated that in some embodiments the memory may be provided at an external entity.

The apparatus 400 in the present embodiment is configured to perform MTU size enforcement. In some embodiments, the memory 420 may store instructions, which when executed by the processor 410, cause the apparatus 400 to perform the operations as described herein:

The apparatus 400 is configured to receive a first MTU size threshold and at least one Packet Detection Rule (PDR) associated with the first MTU size threshold. Each of the at least one PDR is associated with one or more enforcement actions for a Protocol Data Unit (PDU) session. The packet may be a QUIC packet, or a IPv6 packet, or a IPv4 packet where a Don't Fragment (DF) bit of the IPv4 packet is set to 1. The one or more enforcement actions for a PDU session may be indicated in Packet Detection Information (PDI) of the corresponding PDR. Furthermore, the one or more enforcement actions for a PDU session may each be represented by one of: a Forwarding Action Rule (FAR), a Quality of Service Enforcement Rule (QER), and a Usage Reporting Rule (URR).

In a 5G implementation, the first node may be a User Plane Function (UPF). In a 4G implementation, the first node may be a Packet Data Network Gateway-User Plane Function (PWG-U) or a Traffic Detection Function-User Plane Function (TDF-U).

In some embodiments, the first MTU size threshold and the at least one Packet Detection Rule associated with the first MTU size threshold may be received from a second node as part of a Packet Forwarding Control Protocol (PFCP) session establishment request. In these embodiments, the PFCP session establishment request may further comprise an indication to enable a Path MTU Discovery (PMTUD) support procedure. The indication to enable a PMTUD support procedure may refer to a whole PFCP session, it may refer to a specific one of at least one PDRs. The indication to enable a PMTUD support procedure may be in a PFCPSerReg-Flag in some embodiments.

In a 5G implementation, the second node may be a Session Management Function (SMF). In a 4G implementation, the second node may be a Packet Data Network Gateway-Control Plane Function (PWG-C) or a Traffic Detection Function-Control Plane Function (TDF-C).

The apparatus 400 is further configured to determine whether the size of a packet received from a network host (e.g. an application client for uplink packets, an application server for downlink packets) exceeds the first MTU size threshold. In some embodiments, the first MTU size threshold may be associated with the first node, and may be lower than a second MTU size threshold associated with a network interface at which packets including the packet from the network host are received.

The apparatus 400 is further configured to perform an action corresponding to the at least on PDR associated with the first MTU size threshold if it is determined that the size of the packet exceeds the first MTU size threshold. The action corresponding to the at least one PDR associated with the first MTU size threshold may comprise at least one of: dropping the packet, generating a Packet Too Big (PTB) message, and sending the PTB message to a source of the packet (e.g. an application client for uplink packets, or an application server for downlink packets). In some embodiments, the PTB message is an Internet Control Message Protocol (ICMP) PTB message or ICMPv6 PTB message.

In some embodiments, the apparatus 400 may be further configured to, prior to determining whether the size of the packet exceeds the first MTU size threshold, configure the first MTU size threshold for a Data Network Name (DNN), or an Access Point Name (APN), or a Single Network Slice Selection Assistance Information (S-NSSAI) by a Mobile Network Operator. In these embodiments, the apparatus 400 may configure the first MTU size threshold by configuring the first MTU size threshold in a third node as policy data. The third node may be a Unified Data Repository (UDR) in a 5G implementation, or it may be a Subscriber Profile Repository (SPR) in a 4G implementation.

In some embodiments, the apparatus 400 may be configured to, prior to determining whether the size of the packet exceeds the first MTU size threshold, report, from the first node to a fourth node, a Path MTU Discovery (PMTUD) capability of the first node, and select, by the fourth node, the first node among a plurality of nodes of a same type as the first node, the selection being based on the PMTUD capability of the first node. In these embodiments, the apparatus 400 may report the PMTUD capability of the first node at a Packet Forwarding Control Protocol (PFCP) association procedure between the first node and the fourth node. The fourth node may be a Session Management Function (SMF) in a 5G implementation, or it may be a Packet Data Network Gateway-Control Plane Function (PWG-C) or a Traffic Detection Function-Control Plane Function (TDF-C) in a 4G implementation. In some embodiments, the fourth node may be the same entity as the second node.

Furthermore, in these embodiments, the fourth node may allocate a plurality of instances to nodes of a same type as the first node (e.g. UPF instances), and the apparatus may be configured to determine whether the size of the packet exceeds the first MTU size threshold only at one of the plurality of instances. In more detail, in some cases the instance at which whether the size of the packet exceeds the first MTU size threshold is determined may be one that receives uplink traffic on a N3 interface, or one that receives downlink traffic on a N6 interface.

In some embodiments, the apparatus 400 may be further configured to, prior to determining whether the size of the packet exceeds the first MTU size threshold, retrieve, by a fifth node from a sixth node, subscriber management data corresponding to a wireless device (e.g. a User Equipment or a terminal device) from which the packet was received, and one or more policies to be applied for one of: a corresponding target Data Network Name (DNN), a corresponding target Access Point Name (APN), and a corresponding target Single Network Slice Selection Assistance Information (S-NSSAI).

In these embodiments, the one or more policies may include an indication to request MTU size enforcement for the traffic in a Protocol Data Unit (PDU) session for one of: the corresponding target DNN, the corresponding target APN, and a corresponding target S-NSSAI. In addition, in these embodiments, the indication to request MTU size enforcement may refer to the whole PDU session, or to a subset of the traffic within the PDU session.

The fifth node may be a Policy Control Function (PCF) in a 5G implementation or a Policy Control and Charging Rules Function (PCRF) in a 4G implementation. The sixth node may be a Unified Data Repository (UDR in a 5G implementation, or a Subscriber Profile Repository (SPR) in a 5G implementation. In some embodiments, the sixth node may be the same entity as the third node.

Furthermore, in these embodiments, the apparatus 400 may be configured to retrieve, by the fifth node from the sixth node, the value of the first Maximum Transmission Unit (MTU) size threshold.

Moreover, in these embodiments, the apparatus 400 may be further configured to store, at the fifth node, the indication to request MTU size enforcement for the traffic in the PDU session for one of: the corresponding target DNN, the corresponding target APN, and a corresponding target S-NSSAI, generate, at the fifth node, one or more Policy and Charging Control (PCC) rules based on the indication to request MTU size enforcement for the traffic in the PDU session, and send, from the fifth node to the second node, the indication to request MTU size enforcement for the traffic in the PDU session. The indication to request Maximum Transmission Unit (MTU) size enforcement may refer to the whole PDU session or to a specific one of the one or more Policy and Charging Control (PCC) rules.

It will be appreciated that FIG. 4 only shows the components required to illustrate an aspect of the apparatus 400 and, in a practical implementation, the apparatus 400 may comprise alternative or additional components to those shown.

Figure 5A:
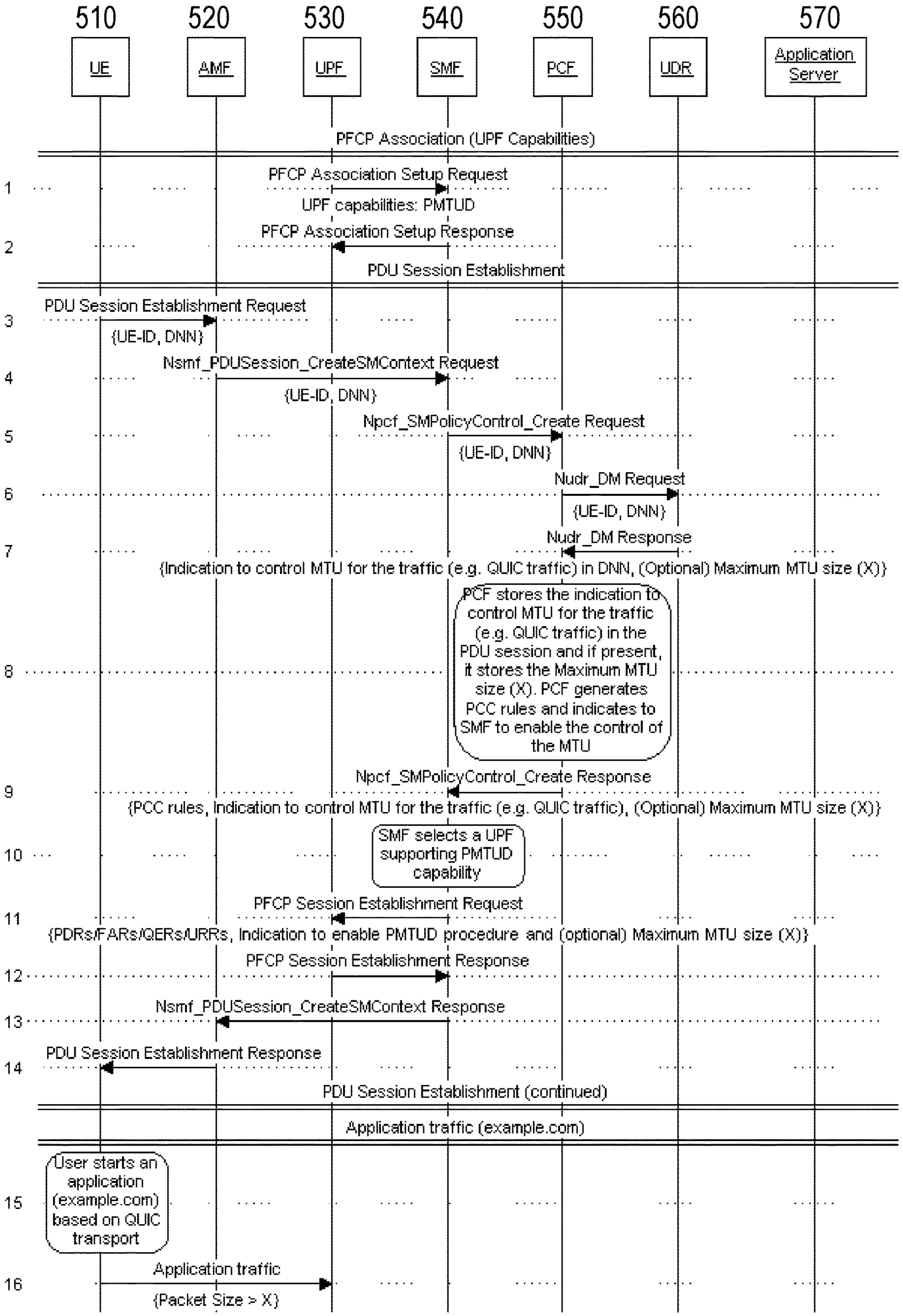
FIG. 5A and FIG. 5B illustrate, in a sequence diagram, an example of a MTU size enforcement procedure according to an embodiment of the present disclosure.
Figure 5B:
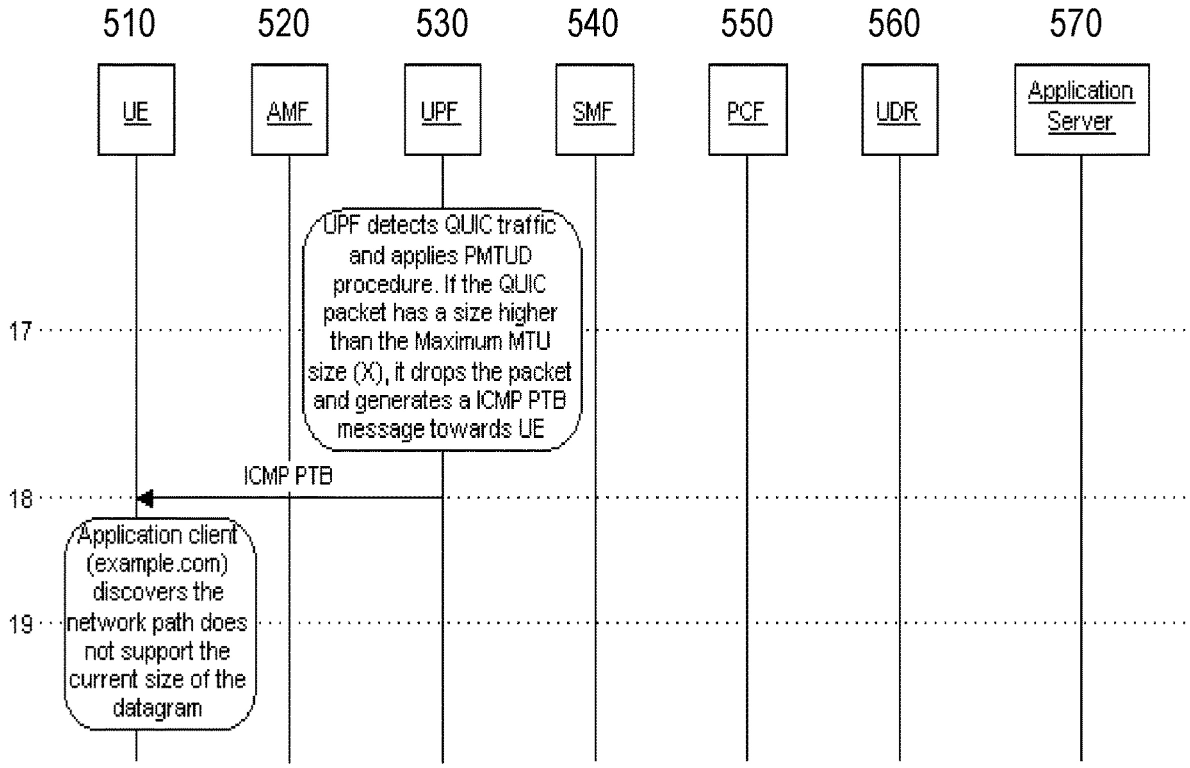

FIG. 5A and FIG. 5B illustrate, in a sequence diagram, an example of a MTU size enforcement procedure according to an embodiment of the present disclosure. Specifically, the current example relates to a Mobile Network Operator (MNO) controlling the MTU size (X bytes) on a per Data Network Name (DNN) basis. Steps 1 to 16 of the exemplary procedure are illustrated in FIG. 5A, while steps 17 to 19 of the exemplary procedure are illustrated in FIG. 5B. The example involves a User Equipment (UE) 510, an Access and Mobility Management Function (AMF), a User Plane Function (UPF) 530, a Session Management Function (SMF) 540, a Policy Control Function (PCF) 550, a Unified Data Repository (UDR) 560, and an Application Server 570.

In the example illustrated in FIG. 5A and FIG. 5B, there are some preconditions assumed to have already been satisfied. One of the preconditions is that the MNO has configured a MTU size (X bytes) for the traffic in a certain DNN or slice (S-NSSAI). This may be preconfigured in the UDR 560 as policy data for the DNN or slice (S-NSSAI).

In this example, the existing mechanism at the PFCP association procedure between the UPF 530 and the SMF 540 is extended to allow reporting of a Path MTU Discovery (PMTUD) capability of the UPF 530, which would allow the SMF 540 to know which UPF(s) support such capability, and this may influence selection of UPF(s). In step 1 as shown in FIG. 5A, the UPF 530 may send a PFCP Association Setup Request to the SMF 540, the request indicating PMTUD capability of the UPF 530. Then, in step 2, the SMF 540 may send a PFCP Association Setup Response to the UPF 530.

Table 1 below shows the User Plane (UP) Function Features, which demonstrates an example of how the PMTUD capability of a UPF can be indicated.

TABLE 1

UP Function Features

| Feature Octet/Bit | Feature | Interface | Description |
|---|---|---|---|
| 5/1 | BUCP | Sxa, N4 | Downlink Data Buffering in CP function is supported by the UP function. |
| 5/2 | DDND | Sxa, N4 | The buffering parameter 'Downlink Data Notification Delay' is supported by the UP function. |
| 5/3 | DLBD | Sxa, N4 | The buffering parameter 'DL Buffering Duration' is supported by the UP function. |
| 5/4 | TRST | Sxb, Sxc, N4 | Traffic Steering is supported by the UP function. |
| 5/5 | FTUP | Sxa, Sxb, N4 | F-TEID allocation/release in the UP function is supported by the UP function. |
| 5/6 | PFDM | Sxb, Sxc, N4 | The PFD Management procedure is supported by the UP function. |
| 5/7 | HEEU | Sxb, Sxc, N4 | Header Enrichment of Uplink traffic is supported by the UP function. |
| 5/8 | TREU | Sxb, Sxc, N4 | Traffic Redirection Enforcement in the UP function is supported by the UP function. |
| 6/1 | EMPU | Sxa, Sxb, N4 | Sending of End Marker packets supported by the UP function. |
| 6/2 | PDIU | Sxa, Sxb, Sxc, N4 | Support of PDI optimised signalling in UP function (see clause 5.2.1A.2). |
| 6/3 | UDBC | Sxb, Sxc, N4 | Support of UL/DL Buffering Control |
| 6/4 | QUOAC | Sxb, Sxc, N4 | The UP function supports being provisioned with the Quota Action to apply when reaching quotas. |
| 6/5 | TRACE | Sxa, Sxb, Sxc, N4 | The UP function supports Trace (see clause 5.15). |
| 6/6 | FRRT | Sxb, N4 | The UP function supports Framed Routing (see IETF RFC 2865 [37] and IETF RFC 3162 [38]). |
| 6/7 | PFDE | Sxb, N4 | The UP function supports a PFD Contents including a property with multiple values. |
| 6/8 | EPFAR | Sxa, Sxb, Sxc, N4 | The UP function supports the Enhanced PFCP Association Release feature (see clause 5.18). |
| 7/1 | DPDRA | Sxb, Sxc, N4 | The UP function supports Deferred PDR Activation or Deactivation. |
| 7/2 | ADPDP | Sxa, Sxb, Sxc, N4 | The UP function supports the Activation and Deactivation of Pre-defined PDRs (see clause 5.19). |
| 7/3 | UEIP | Sxb, N4 | The UP function supports allocating UE IP addresses or prefixes (see clause 5.21). |

TABLE 1-continued

UP Function Features

| Feature Octet/Bit | Feature | Interface | Description |
|---|---|---|---|
| 7/4 | SSET | N4 | UPF support of PFCP sessions successively controlled by different SMFs of a same SMF Set (see clause 5.22). |
| 7/5 | MNOP | Sxa, Sxb, Sxc, N4 | UPF supports measurement of number of packets which is instructed with the flag 'Measurement of Number of Packets' in a URR. See also 5.2.2.2.1. |
| 7/6 | MTE | N4 | UPF supports multiple instances of Traffic Endpoint IDs in a PDI. |
| 7/7 | BUNDL | Sxa, Sxb, Sxc, N4 | PFCP messages bunding (see clause 6.5) is supported by the UP function. |
| 7/8 | GCOM | N4 | UPF support of 5G VN Group Communication. (See clause 5.23) |
| 8/1 | MPAS | N4 | UPF support for multiple PFCP associations to the SMFs in an SMF set (see clause 5.22.3). |
| 8/2 | RTTL | N4 | The UP function supports redundant transmission at transport layer. |
| 8/3 | VTIME | Sxb, N4 | UPF support of quota validity time feature. |
| 8/4 | NORP | Sxa, Sxb, Sxc, N4 | UP function support of Number of Reports as specified in clause 5.2.2.2. |
| 8/5 | IPTV | N4 | UPF support of IPTV service (see clause 5.25) |
| 8/6 | IP6PL | N4 | UPF supports UE IPv6 address(es) allocation with IPv6 prefix length other than default/64 (including allocating/128 individual IPv6 addresses), as specified in clause 4.6.2.2 of of 3GPP TS 23.316 [57]. |
| 8/7 | TSCU | N4 | Time Sensitive Communication is supported by the UPF (see clause 5.26). |
| 8/8 | MPTCP | N4 | UPF support of MPTCP Proxy functionality (see clause 5.20) |
| 9/1 | ATSSS-LL | N4 | UPF support of ATSSS-LLL steering functionality (see clause 5.20) |
| 9/2 | QFQM | N4 | UPF support of per QoS flow per UE QoS monitoring (see clause 5.24.4). |
| 9/3 | GPQM | N4 | UPF support of per GTP-U Path QoS monitoring (see clause 5.24.5). |
| 9/4 | PMTUD | Sxb, Sxc, N4 | Path MTU Discovery is supported by the UP function. |

Feature Octet/Bit: The octet and bit number within the Supported-Features IE, e.g. "5/1".
Feature: A short name that can be used to refer to the octet/bit and to the feature.
Interface: A list of applicable interfaces to the feature.
Description: A clear textual description of the feature.

Next, in steps 3 to 4 shown in FIG. 5A, the UE 510 may trigger PDU Session Establishment procedure for a certain DNN. More specifically, in step 3, the UE 510 may send a PDU Session Establishment Request to the AMF 520, which includes the UE identifier (UE-ID) and the DNN. Then, in step 4, the AMF 520 may send a Nsmf_PDUSession_CreateSMContext Request to the SMF 540, and in step 5 the SMF 540 may send a Npcf_SMPolicyControl_Create request to the PCF 550 in order to create a policy association with the PCF.

In steps 6 and 7 shown in FIG. 5A, the PCF 550 can retrieve, from the UDR 560, the subscriber session management data for the UE-ID and the policies to be applied for the DNN, by sending a Nudr_DM request to the UDR 560 and receiving a Nudr_DM Response from the UDR 560. This subscriber session management data may be extended to include an indication to request MTU size enforcement for the traffic (e.g. QUIC traffic) in the DNN. Optionally, the value of the MTU size may be provisioned by the UDR 560 to the PCF 550. This information can be included in a new attribute in datatype SmPolicyDnnData according to 3GPP TS 29.519.

In step 8 shown in FIG. 5A, the PCF 550 may store the indication to control or enforce MTU for the traffic in the PDU session (i.e. the indication to request MTU size enforcement). In addition, if present, the PCF 550 may also store the value of the MTU size (X bytes). Then, in step 9, the PCF 550 may generate one or more Policy and Charging Control (PCC) rules and indicate to the SMF 540 to enable control or enforcement of the MTU by way of a Npcf_SM- PolicyControl_Create Response message. This message may include the one or more PCC rules, the indication to control or enforce MTU for the traffic, and optionally the value of the MTU size.

In step 10 as shown in FIG. 5A, the SMF 540 may select a UPF which supports PMTUD capability. In this example, this is UPF 530. In case the SMF 540 allocates more than one UPF instance (e.g. edge computing with a first UPF instance acting as Uplink Classifier (ULCL) for local break-out), the SMF 540 may need to activate the procedure described herein with reference to FIGS. 5A and 5B only in one UPF instance (i.e. the one closer to a Radio Access Network (RAN) for uplink traffic), instead of in all UPF instances.

In steps 11 and 12 as shown in FIG. 5A, the SMF 540 may trigger a PFCP Session Establishment procedure towards the UPF 530 to indicate the PDRs and the corresponding enforcement actions (e.g. Forwarding Action Rules (FARs), Quality of Service Enforcement Rules (QERs), Usage Reporting Rules (URRs), etc.) for the PDU session. In more detail, in step 11 the SMF 540 sends a PFCP Session Establishment Request including PDRs, FARs, QERs, URRs, etc., an indication to enable PMTUD procedure, and optionally the MTU size (X bytes). In this regard, the PFCPSEReg-Flags may be extended by including a new flag (PMTUD at bit 2 within Octet 5, explained as follows:

The following bits within Octet 5 shall indicate:

Bit 1—RESTI (Restoration Indication): if this bit is set to "1", it indicates to the UP function that the PFCP session to be established is to restore an existing PFCP session.

Bit 2—PMTUD (PMTUD Indication): If this bit is set to "1", it indicates to the UP function that the PMTUD procedure is activated for the user session.

Bit 3 to 8—Spare, for future use, shall be set to "0" by the sender and discarded by the receiver.

Then, in step 12 as shown in FIG. 5A, the UPF 530 may send a PFCP Session Establishment Response to the SMF 540.

In steps 13 and 14 as shown in FIG. 5A, the PDU session establishment procedure continues. More specifically, in step 13 the SMF 540 may send a Nsmf_PDUSession_CreateSMContext Response to the AMF 520; in step 14, the AMF 520 may send a PDU Session Establishment Response to the UE 510.

In step 15 as shown in FIG. 5A, a user may start an application (example.com) based on QUIC transport. Then, in step 16 as shown in FIG. 5A, the UE 510 (the application client (example.com) in this example) may send application traffic including a QUIC packet with a size bigger than X bytes to the UPF 530.

Subsequently, in step 17 as shown in FIG. 5B, the UPF 530 may detect QUIC traffic and apply the PMTUD procedure. As mentioned above, since the QUIC packet has a size bigger than the MTU size (X bytes), the UPF 530 may drop the QUIC packet and then in step 18 generate a ICMP PTB message towards the UE 510.

In step 19 as shown in FIG. 5B, the application client (example.com) may discover that the network path does not support the current size of the datagram, on the basis of the ICMP PTB message received at the UE 510.

It will be appreciated that the example described above with reference to FIGS. 5A and 5B does not only apply to 5G network architecture, but also 4G network architecture. In a 4G implementation, the method steps may be carried out in a similar manner, but the AMF 520 may be replaced by a Mobility Management Entity (MME), the UPF 530 may be replaced by a Packet Data Network Gateway-User Plane Function (PWG-U) or a Traffic Detection Function-User Plane Function (TDF-U), the SMF may be replaced by a Packet Data Network Gateway-Control Plane Function (PWG-C) or a Traffic Detection Function-Control Plane Function (TDF-C), the PCF 550 may be replaced by a Policy Control and Charging Rules Function (PCRF), and the UDR 560 may be replaced by a Subscriber Profile Repository (SPR).

Embodiments of the disclosure thus introduce improved methods, systems, and apparatuses for performing MTU size enforcement.

There is also provided a computer program product comprising a computer readable medium, the computer readable medium having computer readable code embodied therein, the computer readable code being configured such that, on execution by a suitable computer or processor, the computer or processor is caused to perform the method or methods described herein. Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The above disclosure sets forth specific details, such as particular embodiments or examples for purposes of explanation and not limitation. It will be appreciated by one skilled in the art that other examples may be employed apart from these specific details.

Abbreviations

| Abbreviation | Explanation |
|---|---|
| AF | Application Function |
| AMF | Access and Mobility Management Function |
| AN | Access Network |
| AS | Application Server |
| DF | Don't Fragment |
| DL | Downlink |
| GPSI | Generic Public Subscription Identifier |
| ICMP | Internet Control Message Protocol |
| IE | Information Element |
| IP | Internet Protocol |
| MNO | Mobile Network Operator |
| MSS | Maximum Segment Size |
| MTU | Maximum Transmission Unit |
| NEF | Network Exposure Function |
| NR | Next Generation Radio/New Radio |
| PCF | Policy Control Function |
| PCRF | Policy Control Rules Function |
| PDN | Packet Data Network |
| PDU | Protocol Data Unit |
| PFD | Packet Flow Description |
| PGW | Packet Gateway |
| PGW-C | PDN Gateway Control plane function |
| PGW-U | PDN Gateway User plane function |
| PLMN | Public Land Mobile Network |
| PLPMTUD | Packetization Layer Path Maximum Transmission Unit Discovery |
| PMTU | Path Maximum Transmission Unit Discovery |
| PTB | Packet Too Big |
| SMF | Session Management Function |
| S-NSSAI | Single Network Slice Selection Assistance Information |
| SUPI | Subscription Permanent Identifier |
| TCP | Transmission Control Protocol |
| TDF | Traffic Detection Function |
| TDF-C | Traffic Detection Function Control plane |
| TDF-U | Traffic Detection Function User plane |
| TLS | Transport Layer Security |
| UDP | User Datagram Protocol |
| UDR | Unified Data Repository |
| UL | Uplink |
| UL CL | Uplink Classifier |
| UPF | User Plane Function |

The invention claimed is:

1. A method performed by a first node for performing Maximum Transmission Unit (MTU) size enforcement, the method comprising:

receiving, at the first node, a first MTU size threshold and at least one Packet Detection Rule (PDR) associated with the first MTU size threshold, wherein each of the at least one PDR is associated with one or more enforcement actions for a Protocol Data Unit (PDU) session;

determining, at the first node, whether the size of a packet received from a network host exceeds the first MTU size threshold; and performing, at the first node, an action corresponding to the at least one PDR associated with the first MTU size threshold if it is determined that the size of the packet exceeds the first MTU size threshold.

2. The method of claim 1, wherein the action corresponding to the at least one PDR associated with the first MTU size threshold comprises at least one of:

dropping the packet, generating a Packet Too Big (PTB) message, and sending the PTB message to a source of the packet.

3. The method of claim 2, wherein the PTB message is an Internet Control Message Protocol (ICMP) PTB message or ICMPv6 PTB message.

4. The method of claim 2, wherein the source of the packet is an application client or an application server.

5. The method of claim 1, wherein the first MTU size threshold and the at least one PDR associated with the first MTU size threshold are received from a second node as part of a Packet Forwarding Control Protocol (PFCP) session establishment request.

6. The method of claim 5, wherein the PFCP session establishment request further comprises an indication to enable a Path MTU Discovery (PMTUD) support procedure.

7. The method of claim 6, wherein the indication to enable a PMTUD support procedure refers to a whole PFCP session or to a specific one of at least one PDRs.

8. The method of claim 1, wherein the first MTU size threshold is associated with the first node and is lower than a second MTU size threshold associated with a network interface at which packets including the packet from the network host are received.

9. The method of claim 1, further comprising, prior to determining whether the size of the packet exceeds the first MTU size threshold, receiving configuration, from a Mobile Network Operator, of the first MTU size threshold for a Data Network Name (DNN) or an Access Point Name (APN) or a Single Network Slice Selection Assistance Information (S-NSSAI).

10. The method of claim 9, wherein configuring the first MTU size threshold comprises configuring the first MTU size threshold in a third node as policy data.

11. The method of claim 1, further comprising, prior to determining whether the size of the packet exceeds the first MTU size threshold, reporting, from the first node to a fourth node, a Path MTU Discovery (PMTU), capability of the first node for selecting, by the fourth node, the first node among a plurality of nodes of a same type as the first node, based on the PMTUD capability of the first node.

12. The method of 1, wherein reporting the PMTUD capability of the first node is performed at a Packet Forwarding Control Protocol (PFCP) association procedure between the first node and the fourth node.

13. The method of claim 11, wherein the fourth node allocates a plurality of instances to nodes of a same type as the first node, and wherein determining whether the size of the packet exceeds the first MTU size threshold is only performed at one of the plurality of instances.

14. The method of claim 13, wherein the instance at which whether the size of the packet exceeds the first MTU size threshold is determined is one that receives uplink traffic on a N3 interface, or one that receives downlink traffic on a N6 interface.

15. The method of claim 1, further comprising, prior to determining whether the size of the packet exceeds the first MTU size threshold:

retrieving subscriber management data corresponding to a wireless device from which the packet is received, and one or more policies to be applied for one of: a corresponding target Data Network Name (DNN), a corresponding target Access Point Name (APN), and a corresponding target Single Network Slice Selection Assistance Information (S-NSSAI);

wherein the one or more policies include an indication to request MTU size enforcement for the traffic in a PDU session for one of: the corresponding target DNN, the corresponding target APN, and a corresponding target S-NSSAI.

16. The method of claim 1, wherein the packet is one of: a QUIC packet, \a IPV6 packet, and a IPv4 packet where a Don't Fragment (DF) bit of the IPV4 packet is set to 1.

17. The method of claim 1, wherein the one or more enforcement actions for a PDU session is indicated in Packet Detection Information (PDI) of the corresponding Packet Detection Rule (PDR).

18. The method of claim 1, wherein the one or more enforcement actions for a PDU session are each represented by one of: a Forwarding Action Rule, a Quality of Service Enforcement Rule, and a Usage Reporting Rule.

19. A communication system configured to perform Maximum Transmission Unit (MTU) size enforcement, the communication system comprising a first network node having processing circuitry configured to:

receive a first MTU size threshold and at least one Packet Detection Rule (PDR) associated with the first MTU size threshold, wherein each of the at least one PDR is associated with one or more enforcement actions for a PDU session;

determine whether the size of a packet received from a network host exceeds the first MTU size threshold; and perform an action corresponding to the at least on PDR associated with the first MTU size threshold if it is determined that the size of the packet exceeds the first MTU size threshold.

20. An apparatus comprising a processor coupled with a memory, wherein the apparatus is configured to:

receive a first Maximum Transmission Unit (MTU) size threshold and at least one Packet Detection Rule (PDR) associated with the first MTU size threshold, wherein each of the at least one PDR is associated with one or more enforcement actions for a PDU session;

determine whether the size of a packet received from a network host exceeds the first MTU size threshold; and perform an action corresponding to the at least one PDR associated with the first MTU size threshold if it is determined that the size of the packet exceeds the first MTU size threshold.

* * * * *